United States Patent
Rulkens et al.

(10) Patent No.: US 9,090,750 B2
(45) Date of Patent: Jul. 28, 2015

(54) PLASTIC COMPONENT FOR A LIGHTING SYSTEMS

(75) Inventors: Rudy Rulkens, Margraten (NL); Hans K Van Dijk, Sittard (NL); Sanjay K. R. K. Jain, Mumbai (IN)

(73) Assignee: DSM IP ASSETS B.V., Heerlen (NL)

( * ) Notice: Subject to any disclaimer, the term of this patent is extended or adjusted under 35 U.S.C. 154(b) by 597 days.

(21) Appl. No.: 12/670,555

(22) PCT Filed: Jul. 17, 2008

(86) PCT No.: PCT/EP2008/005866
§ 371 (c)(1),
(2), (4) Date: Jul. 6, 2010

(87) PCT Pub. No.: WO2009/012933
PCT Pub. Date: Jan. 29, 2009

(65) Prior Publication Data
US 2010/0270577 A1 Oct. 28, 2010

(30) Foreign Application Priority Data
Jul. 23, 2007 (EP) ..................... 07014393

(51) Int. Cl.
| | |
|---|---|
| *C08G 69/08* | (2006.01) |
| *C08K 3/00* | (2006.01) |
| *C08L 77/10* | (2006.01) |
| *C08L 77/06* | (2006.01) |
| *C08G 69/26* | (2006.01) |

(52) U.S. Cl.
CPC ............ *C08K 3/0008* (2013.01); *C08G 69/265* (2013.01); *C08K 3/0033* (2013.01); *C08L 77/06* (2013.01); *C08L 77/10* (2013.01)

(58) Field of Classification Search
CPC ....... C08L 77/06; C08L 77/10; C08J 2377/06
USPC .......................................... 528/310, 322, 335
See application file for complete search history.

(56) References Cited

U.S. PATENT DOCUMENTS

| | | |
|---|---|---|
| 2003/0158308 A1 | 8/2003 | Nay et al. |
| 2004/0034152 A1* | 2/2004 | Oka et al. .................... 524/497 |
| 2006/0293427 A1* | 12/2006 | Martens et al. ............... 524/404 |

FOREIGN PATENT DOCUMENTS

| | | |
|---|---|---|
| EP | 1 354 915 | 10/2003 |
| WO | WO 01/25311 | 4/2001 |
| WO | WO 2007/085406 | 8/2007 |

OTHER PUBLICATIONS

International Search Report for PCT/EP2008/005866, mailed Dec. 10, 2008.
Written Opinion of the International Searching Authority for PCT/EP2008/005866, mailed Dec. 10, 2008.
International Preliminary Report on Patentability dated Jan. 26, 2010.

* cited by examiner

*Primary Examiner* — Gregory Listvoyb
(74) *Attorney, Agent, or Firm* — Nixon & Vanderhye P.C.

(57) ABSTRACT

The invention relates to a plastic component for use in a lighting system, the plastic component comprising a semi-aromatic polyamide (X) comprising repeat units derived from aliphatic diamines and dicarboxylic acids wherein: (a) the aliphatic diamines consist a mixture of 10-70 mole % of a short chain aliphatic diamine with 2-5 C atoms and 30-90 mole % of a long chain aliphatic diamine with at least 6 C atoms; (b) the dicarboxylic acids consist of a mixture of 5-65 mole % aliphatic dicarboxylic acid and optionally aromatic dicarboxylic acid other than terephthalic acid, and 35-95 mole % terephthalic acid; and (c) the combined molar amount of terephthalic acid and the long chain aliphatic diamine is at least 60 mole %, relative to the total molar amount of the dicarboxylic acids and diamines. The invention also relates to a polymer composition that can be used for making the said plastic component comprising 100 pbw of a semi-aromatic polyamide (X) and 1-250 pbw of an inorganic material.

12 Claims, No Drawings

PLASTIC COMPONENT FOR A LIGHTING SYSTEMS

This application is the U.S. national phase of International Application No. PCT/EP2008/005866 filed 17 Jul. 2008, which designated the U.S. and claims priority to Europe Application No. 07014393.8 filed 23 Jul. 2007, the entire contents of each of which are hereby incorporated by reference.

The present invention relates to a plastic component for use in a lighting system. More specifically, the present invention relates to a plastic component that forms an integral part of a light source, such as a reflector housing of a LED (light emitting diode), a lamp base of an energy saving lamp, as well as to plastic components that form an integral part of a lighting armature, such as reflector plates in backlight systems and reflectors of automotive lights, plastic mounting substrates, heat sinks and other plastic components affixed or secured to the light source or lighting armature.

The present invention also relates to a polymer composition that can be used for making the said plastic component. More specifically, the present invention relates to a polymer composition comprising a semi-aromatic polyamide comprising repeat units derivable from terephthalic acid and aliphatic diamines, and which polymer composition offers improved heat resistance in surface mounting processes.

Light emitting diodes (LEDs) are widely used in a variety of electronics applications where bright lighting is desirable. In these applications the LED is typically attached to a substrate and positioned within or along a light reflective surface so that its lighting characteristics are enhanced and directed in a desirable manner. To dissipate the heat generated by the electric current, the LEDs or the substrate to which the LEDs are attached, are regularly also attached to a heat sink or a heat dissipating device. Inasmuch as previous applications incorporated light emitting diodes of red and green, the addition of only recently developed white light using blue chips has greatly contributed to the expanded role and possible applications of LEDs. However the materials used in conjunction with such lighting applications typically face demanding challenges, largely due to the poor adhesive qualities of encapsulation materials, undesirable moisture absorption associated with conventional materials, poor thermal properties, thermal oxidation, poor UV resistance, blistering in soldering applications, and the like.

Polymer compositions comprising LCP and polyamides, more particularly semi-aromatic polyamides, are widely used in plastic PLCC (Plastic Leaded Chip Carrier) components associated with lighting systems. Many of these applications require that the plastic components be in the vicinity of, or in contact with the light source generating heat. Particularly in LEDs, heat generated at the P-N junction (the junction between an n-region and a p-region in a diode) of the LED chip because of the current supplied is a concern. Apart from that, many components used in such lighting systems are mounted by processes comprising a heat treatment step, such as surface mounting techniques (SMT) comprising a reflow soldering step. Polyamides tend to show blistering during such processes. Furthermore, to reduce weight and due to miniaturization the components must have ever smaller thicknesses, requiring that the materials should have a good mouldability, i.e. to have a good fluidity in the moulding operation, meanwhile resulting in good mechanical properties for the moulded plastic component. For attaining the required mechanical properties, the polymer compositions may need to comprise a high load of reinforcement materials. To comply with other requirements, such as thermal conductivity to dissipate heat from the heat source, and/or to reflect the light form the light source, polymer compositions may need to comprise high loadings of thermally conductive materials and/or light reflective materials. The excellent mouldability should be retained while high loadings of such reinforcement materials, thermally conductive materials and/or light reflective materials are present. Most of the components are high precision parts, emphasized by the miniaturization.

Moreover, LED assemblies generally comprise many components consisting apart form the chip or die, of various electrically conductive elements as well as electrically insulating elements. Furthermore, for the proper functioning of the LEDs there must be a solid electrically conductive contact between all the electrically conductive elements connected to the n-region, as well as between the electrically conductive elements connected to the p-region. These transitions where a solid electrically conductive contact between two elements has to be present include the contacts between the n-region or the p-region and the bonding wires used, between the bonding wires and electrically conductive leads of the lead frame used, and/or between either the n-region or the p-region and a die attach layer when applied.

Therefore the processes applied for the production of such a LED assembly, further herein denoted LED assembly process, comprise several consecutive steps for making the electrically conductive contacts including different combinations, if not all, of the following steps: bonding of the bonding wires to the n-region and/or the p-region, bonding of the bonding wires to the electrically conductive leads of the lead frame, (which is called WIRE BONDING) and/or application of a die attach layer between either the n-region or the p-region and one of the electrically conductive leads of the lead frame (which process is called DIE BONDING)

Thus consecutive mounting steps are applied, as is mentioned e.g. in JP20070112765-A. Wire bonding for making electrically conductive contact between the chip and the lead frame is generally done by ultrasonic welding, for example by gold to gold ultrasonic bonding. As mentioned in EP-1524705-A2 wire bonding is a complicated process, during which the LED may be damaged incidentally. Nowadays mounting techniques are applied wherein the mounting includes a chip bonding step. In such a process, the bonding may be accomplished with a thermal reflow process using for example, a silver epoxy solder. Tin alloys are also promoted as the contact metallization designed for die attach process temperatures at or below 270° C. (for example by Cree Optoelectronics), enabling surface mount packages which utilize plastic materials in the lead frame substrate. More recently, there is a trend moving towards eutectic bonding for the chip bonding step. Examples thereof are mentioned in EP-1524705-A2 and US 2005/01408081-A1.

Next to the assembly process for the production of the LED systems, electrical and electronic components, comprising such LED assemblies mounted on a substrate, are made by a mounting process wherein the conductive leads of the LED are mounted on a PCB. This process is also called Soldering Process. For example the entire LED assembly can be mounted on a PCB (printed circuit board) for usage in various applications. For mounting the LEDs onto the PCB typically reflow surface mounting is used.

Whereas in the past lead containing solder compositions were used in such SMT processes, there is a trend towards lead free solder compositions. For the lead free solder compositions, alloys such as tin, bismuth and or indium based alloys, having a higher melt temperature and requiring higher temperatures during the reflow soldering process are used.

To retain the bonding integrity of the solder or bonding metal used in the first step or steps (the LED assembly steps), that solder or metal material used therein must have a higher melting point than the solder used in the surface mounting process. For the eutectic bonding process alloys of even higher melting metals are used, such as Si, Ag and Au, even Ni, Ti and Pt as is mentioned in 2005/01408081-A1. In EP-1524705-A2 eutectic bonding as well as gold-to-gold ultrasonic bonding is reported. A preferred alloy that is used for eutectic bonding is a eutectic gold-tin alloy with 80% Au and 20% Sn, with a eutectic point of 280° C. For the eutectic process a bell shaped temperature profile is applied with a peak reflow temperature usually around 315-320° C., a dwell time at peak temperature of 2-3 minutes, and a cycle time of about 20-30 minutes. Absence of blistering at these high processing temperatures and retention of dimensional integrity of the components is essential. Though the exposure of the components to the elevated temperatures applied in these processes might be relatively short, the peak temperatures and/or the local heating can be very high, thus that many plastic materials fail.

WO-2006/135842 describes a plastic component for a light emitting diode assembly, comprising a polymer composition comprising a semi-aromatic polyamide. The semi-aromatic polyamide of WO-2006/135842 comprises repeat units derived from dicarboxylic acid monomers comprising 50 to 100 mole % terephthalic acid, and diamine monomers comprising 50 to 100 mole % diamines having from 10 to 20 carbon atoms. The remaining plastic components optionally present comprise 0 to 50 mole % of dicarboxylic acid being an aromatic acid other than terephthalic acid and/or an aliphatic dicarboxylic acid having from 4 to 20 carbon atoms, and 0 to 50 mole % of diamines having from 4 to 9 carbon atoms. The products are claimed to have improved properties over for example polyamide-6 and polyamide-6,6. However, in WO-2006/135842 only one such a polymer is mentioned in particular, being polyamide-10,T/10,12 (90/10 molar ratio), which is compared to polyamide-6T/66 and polyamide-9T.

In WO-2006/135842 test results of polyamide-10,T/10,12 obtained in a generically described blistering test are compared with polyamide-6T/66 (55/45 molar ratio) and polyamide-9T (being 9T/~8T with 85/15 molar ratio). Polyamide-10,T/10,12 showed a better blister resistance than polyamide-6T/66, but similar to that of polyamide-9T. Furthermore, these materials show insufficient retention of the mechanical properties while also tending to crack because of poor toughness.

In view of the above described requirements and trends towards miniaturization and the assembly and mounting processes involving increasing process temperatures, there is a need for plastic components for lighting systems, and materials that can be used therein, which have improved properties, either during continuous use and/or during processing steps, such as high heat resistance and low moisture sensitivity, and in particular improved blister resistance and dimensional stability, meanwhile retaining good mouldability and mechanical properties.

Accordingly, it is an object of the invention to provide plastic components for lighting systems, and materials that can be used therein, that have an improved blister resistance and/or dimensional stability.

This aim has been achieved with the plastic component according to the invention, wherein the plastic component comprises a polymer composition comprising a semi-aromatic polyamide X, wherein a. the dicarboxylic acids (A) consist of a mixture of 5-65 mole % aliphatic dicarboxylic acid and optionally aromatic dicarboxylic acid other than terephthalic acid (A1), and 35-95 mole % terephthalic acid (A2);

b. the aliphatic diamines (B) consist a mixture of 10-70 mole % of a short chain aliphatic diamine with 2-5 C atoms (B1) and 30-90 mole % of a long chain aliphatic diamine with at least 6 C atoms (B2); and c. the combined molar amount of terephthalic acid (A2) and the long chain aliphatic diamine (B2) is at least 60 mole %, relative to the total molar amount of the dicarboxylic acids and diamines.

The effect of the said semi-aromatic polyamide herein, which for compactness and readability is also denoted as semi-aromatic polyamide X, or even polyamide X, in the plastic component according to the invention is that blister resistance and/or dimensional stability are improved compared to the plastic components made of a corresponding semi-aromatic polyamide such polyamide-10,T/10,12 polyamide-6T/66 and polyamide-9T. These improvements are highly surprising since the new materials do not always have a lower moisture absorption compared to polyamide-9,T tested under the same circumstances. These improvements are also highly surprising in view of the fact that polyamides primarily based on the short chain diamine, such as polyamide-4,6 and polyamide 4,6/4,T are highly susceptible to moisture uptake and very sensitive for consequent dimensional chances and blistering.

The plastic components made with the said polymer composition can be made with high dimensional precision because the material shows a very good flow, and when formulated with the appropriate additives good reflection performance and heat dissipation performance are achieved, meanwhile retaining good flow properties. In addition, the polymer composition has good mechanical properties and retention thereof at elevated temperature and humid conditions.

The semi-aromatic polyamide used in the present invention comprises units derived from aliphatic diamines and dicarboxylic acids. The units derived from the dicarboxylic acids can be denoted as A-A units and the units derived from the diamines can be denoted as B-B units. In line therewith the polyamides can be denoted as AABB polymers, corresponding with the classification applied in for example, Nylon Plastic handbook, Ed. M. I. Kohan, Hanser Publishers, Munich, ISBN 1-56990-189-9 (1995), page 5.

The short chain aliphatic diamine is a C2-05 aliphatic diamine, or a mixture thereof. In other words it has 2-5 carbon (C) atoms. The short chain aliphatic diamine may be, for example, 1,2-ethylene diamine, 1,3-propanediamine, 1,4-butanediamine and 1,5-pentane diamine, and mixtures thereof. Preferably, the short chain aliphatic diamine is chosen from the group consisting of 1,4-butanediamine, 1,5-pentane diamine and mixtures thereof, more preferably 1,4-butanediamine.

The short chain aliphatic diamine (B1) is a C2-C5 aliphatic diamine, or a mixture thereof. In other words it has 2-5 carbon (C) atoms. The short chain aliphatic diamine may be, for example, 1,2-ethylene diamine, 1,3-propanediamine, 1,4-butanediamine and 1,5-pentane diamine, and mixtures thereof. Preferably, the short chain aliphatic diamine is chosen from the group consisting of 1,4-butanediamine, 1,5-pentane diamine and mixtures thereof, more preferably 1,4-butanediamine.

The long chain aliphatic diamine (B2) is an aliphatic diamine with at least 6 carbon (C) atoms. The long chain aliphatic diamine may be linear, branched and/or alicyclic. The long chain aliphatic diamine may be, for example, 2-methyl-1,5-pentanediamine (also known as 2-methylpentamethylene diamine), 1,5-hexanediamine, 1,6-hexane diamine, 1,4-cyclohexanediamine, 1,8-octanediamine, 2-methyl-1,8-octanediamine, 1,9-nonanediamine, trimethylhexamethylene diamine, 1,10-decane diamine, 1,11-undecanediamine, 1,12-dodecanediamine, m-xylylenediamine and p-xylylenediamine, and any mixture thereof. Preferably, the long chain aliphatic diamine has 6-12 carbon atoms, and suitably is a C8- or C10 diamine. In a preferred embodiment, the long chain diamine consists of 50-100 mole %, more preferably 75-100 mole % of a diamine having 6 to 9 carbon atoms. This results in materials that have the even better high temperature properties. More preferably, the long chain aliphatic diamine is chosen from the group consisting of 1,6-hexane diamine, 2-methyl-1,8-octanediamine, 1,9-nonanediamine, and mixtures thereof, more preferably 1,6-hexane diamine. The advantage of this preferred choice, and in particular of the more preferred choice of 1,6-hexane diamine is that the high temperature properties of the copolyamide according to the invention are even better.

The aliphatic dicarboxylic acid may be straight chain, branched chain and/or alicyclic, and the number of carbon atoms therein is not specifically restricted. However, the aliphatic dicarboxylic acid preferably comprises a straight chain or branched chain aliphatic dicarboxylic acid with 4 to 25 carbon atoms, or a mixture thereof, more preferably 6-18 and still more preferably 6-12 carbon atoms. Suitable aliphatic dicarboxylic acid are, for example, adipic acid (C6), 1,4-cyclohexane dicarboxylic acid (C8), suberic acid (C8), sebacic acid (C10), dodecanoic acid (C12) or a mixture thereof. Preferably, the aliphatic dicarboxylic acid is a C6-C10 aliphatic dicarboxylic acid, including adipic acid, sebacic acid or a mixture thereof, and more the aliphatic dicarboxylic acid is a C6-C8 aliphatic dicarboxylic acid. Most preferably the aliphatic dicarboxylic acid is adipic acid.

The aromatic dicarboxylic acid may comprise, next to terephthalic acid, other aromatic dicarboxylic acids, for example isophthalic acid and/or naphthalane dicarboxylic acid.

The semi-aromatic polyamide may suitably comprises, next to terephthalic acid, aliphatic dicarboxylic acids or aliphatic dicarboxylic acids and aromatic dicarboxylic acids other than terephthalic acid. Preferably, the amount of the aromatic dicarboxylic acid other than terephthalic acid, if present, is less than 50 mole %, more preferably less than 25 mole %, relative to the total molar amount of aliphatic dicarboxylic acid and aromatic dicarboxylic acids other than terephthalic acid (A1).

In the semi-aromatic polyamide in the composition according to the invention, the short chain aliphatic diamine (B1) makes up for 10-70 mole % and the long chain aliphatic diamine (B2) makes up for the remaining 30-90 mole % of the aliphatic diamine units (B).

Preferably, the molar amount of the short chain aliphatic diamine is at most 60 mole %, more preferably 50 mole %, 40 mole %, or even 35 mole % relative to the molar amount of short chain and long chain diamines. An advantage of the copolyamide with such a lower molar amount of the short chain diamine is that for the copolyamide with a given Tm the blistering behaviour improves.

Also preferably, the molar amount of the short chain aliphatic diamine in the semi-aromatic polyamide is at least 15 mole %, more preferably, at least 20 mole %, relative to the total molar amount of short chain aliphatic diamine and long chain aliphatic diamine. The higher the molar amount of the short chain aliphatic diamine the better is the thermal stability of the polyamide.

The aliphatic dicarboxylic acid and optionally aromatic dicarboxylic acids other than terephthalic acid (A1) make up for 5-65 mole % and the terephthalic acid (A2) makes up for the remaining 35-95 mole % of the dicarboxylic acid units (A).

Preferably, the dicarboxylic acids consist for at least 40 mole %, more preferably at least 45 mole %, or even at least 50 mole %, of terephthalic acid. The advantage of an increased amount of terephthalic acid, is that the high temperature properties are further improved. Also preferably the amount of the aliphatic dicarboxylic acid and, if present, aromatic dicarboxylic acids other than terephthalic acid (A1) is at least 10 mole %, more preferably at least 15 mole % of the dicarboxylic acid. This higher amount has the advantage that the composition has a better processability.

In a highly preferably embodiment, the dicarboxylic acids (A) consist of 50-85 mole % of terephthalic acids (A2) and 50-15 mole % of aliphatic dicarboxylic acid and optionally aromatic dicarboxylic acids other than terephthalic acid (A1), relative to the molar amount of dicarboxylic acids and the aliphatic diamines (B) consist of 40-80 mole % long chain diamines (B2) and 60-20 mole % short chain diamines (B1), relative to the total molar amount of aliphatic diamines. This preferred composition gives a better overall balance in properties, comprising an even better resistance against short term high peak temperatures as well as better retention of mechanical properties and reduced outgassing upon long term exposure to elevated temperatures while retaining good melt processability.

Whereas the minimum amount for the long chain aliphatic diamine (B2) is 30 mole %, relative to the total molar amount of aliphatic diamines, and the minimum amount for the terephthalic acid (A2) is 35 mole %, relative to the molar amount of dicarboxylic acids, the combined molar amount of the terephthalic acid (A2) and the long chain aliphatic diamine (B2) is at least 60 mole %, relative to the total molar amount of the dicarboxylic acids and diamines. The consequence thereof is that when the relative amount of the long chain aliphatic diamine is the minimal 30 mole %, the relative amount of terephthalic acid is at least 90 mole %. Analogously, when the relative amount of terephthalic acid is the minimal 35 mole %, the relative amount of the long chain aliphatic diamine is at least 85 mole %.

In another highly preferably embodiment, the sum of the molar amount of terephthalic acid (A2) and the long chain aliphatic diamine (B2) is at least 65 mole %, more preferably at least 70 mole % and still more preferably at least 75 mole %, relative to the total molar amount of dicarboxylic acids and diamines. The advantage of the polyamide with the sum of the molar amount of terephthalic acid (A2) and the long chain aliphatic diamine (B2) being higher is that the polyamide combines an even better resistance against short term high peak temperatures with a better thermal stability and good melt processability. Suitably, the said sum is in the range of 70-85 mole %, or even 75-80 mole %, relative to the total molar amount of dicarboxylic acids and diamines.

Next to the A-A-B-B units derived from dicarboxylic acids (AA) and diamines (BB), the polyamide according to the invention may comprise units derived from other components, such as aliphatic aminocarboxylic acids (AB units) and the corresponding cyclic lactams, as well as small amounts of a branching agent and/or chain stoppers.

Preferably, the polyamide according to the invention comprises at most 10 mass %, more preferably at most 8 mass %, and still more preferably at most 5 mass %, relative to the total mass of the polyamide, of units derived from components other than dicarboxylic acids and diamines. Most preferably the polyamide according to the invention does not comprise such other components at all and consists only of A-A-B-B units derived from dicarboxylic acids and diamines. The advantage is a logistically simpler process and better crystalline properties.

The semi-aromatic polyamide is a thermoplastic semi-crystalline semi-aromatic copolyamide. The semi-crystalline polyamide suitably has a melting temperature (Tm) of at least 290° C., and preferably at least about 300° C., more preferably at least 310° C. Also suitably the melting temperature is less than 350° C., and preferably less than about 340° C. Also preferably, the semi-aromatic polyamide has a glass transition temperature (Tg) of more than 100° C., more preferably at least 110° C., or even at least 120° C. Preferably the Tg is at most 140° C., more preferably at most 130° C. The higher Tm, as well the higher Tg, the better is the performance of the component according to the invention in reflow soldering processes and eutectic bonding processes. A further advantage of the Tg being within these limits is an even better balance in blistering resistance, dimensional stability and processing behaviour.

With the term melting point (temperature) is herein understood the temperature, measured according to ASTM D3417-97/D3418-97 by DSC with a heating rate of 10° C./min, falling in the melting range and showing the highest melting rate. With the term glass transition point is herein understood the temperature, measured according to ASTM E 1356-91 by DSC with a heating rate of 10° C./minute and determined as the temperature at the peak of the first derivative (with respect of time) of the parent thermal curve corresponding with the inflection point of the parent thermal curve.

The said semi-aromatic polyamide may have a viscosity varying over a wide range. It has been observed that the relative viscosity may be as low as 1.6 ore even lower while still retaining good mechanical properties for the reinforced flame retardant composition. Here the relative viscosity is measured in 96% sulphuric acid according to method to ISO 307, fourth edition. Preferably the relative viscosity is at least 1.7, more preferably 1.8 or even 1.9. Retention of mechanical properties is really important for such moulded parts, which is still the case at such a low relative viscosity. Also preferably the relative viscosity is less than 4.0, more preferably less than 3.5 and still more preferably less than 3.0. This lower has relative viscosity the advantage that the flow during moulding is better and moulded parts with thinner elements can be made.

The said semi-aromatic polyamide may also consist of a blend of a semi-aromatic polyamide with a high relative viscosity and one with a low relative viscosity. Suitably, the blend comprises a component with a relative viscosity of at least 1.8, more preferably at least 1.9 and one component with a relative viscosity is of less than 1.7, more preferably less than 1.6. The first component with the relative viscosity of at least 1.9 can have a molecular weight of at least 10,000, while the second component with the relative viscosity of less than 1.6 can have a molecular weight of less than 7,500, preferably less than 5,000, still more preferably less than 2,500. The first and second component may be present in a weight ratio varying over a large range, and preferably in the range of 19:1-1:1, more preferably 9:1-3:1. The advantage of the presence of the second component with the relative low viscosity is that the moulding behaviour of the polyamide composition is further improved allowing moulding of parts with even thinner wall sections.

The polymer composition that is used in the component for use in lighting systems according to the invention suitably comprises, next to the semi-aromatic polyamide X, one or more other components. The polymer composition may comprise, for example, inorganic materials, like inorganic fillers and/or reinforcing agents, other polymeric materials, flame retardants and further additives.

Preferably, the polymer composition comprises an inorganic material. The inorganic material may be present in an amount varying over large range. Preferably, the polymer composition comprises the inorganic material in an amount of 1-250 pbw, preferably 5-200, more preferably 10-150 pbw, or even 50-100 pbw, relative to 100 pbw of the semi-aromatic polyamide X.

An advantage of the said composition comprising the said semi-aromatic polyamide X and the inorganic material is that the material has a lower thermal expansion. This thermal expansion is further reduced, and gets closer to other components in the LED assembly, when the content of the inorganic material being higher, thus contributing to better retention of the integrity of the LED parts during further processing and of the LED assembly during its functional life time.

The inorganic material suitably comprises an inorganic filler and/or reinforcing agent. Examples of suitable fillers are glass flakes, calcium carbonate and mineral filler such as clay, kaoline, wollastonite, and talc, and other minerals, and any combination thereof. The inorganic material may also comprise a thermally conductive material and/or a light reflective material In a preferred embodiment the composition comprises a light reflective material (Compound C). The light reflective material may be any inorganic compound, including inorganic pigments, inorganic reinforcing agents, inorganic fillers, and fibrous and thin plate inorganic compounds, which can reflect visible and/or UV light. The light reflective material suitably has a density of at least 2.5 $g/cm^3$, preferably at least 3 $g/cm^3$. Examples of suitable light reflective materials are white pigments such as titanium dioxide (TiO2), preferably rutile titanium dioxide because it provides a higher light-ray reflection ratio, fillers such as barium sulphate (BaSO4), and fibrous material such as wollastonite and potassium titanate fibres.

The light reflective material may be present in an amount varying over large range.

Preferably, the light reflective material is present in an amount of 2-100 pbw, preferably 5-50 pbw, 10-20 pbw, relative to 100 pbw of semi-aromatic polyamide X. When other components are present as well, the light reflective material is preferably present in an amount of 0.6-40 wt. %, more preferably 1.5-30 wt. %, or even 5-20 wt. %, relative to the total weight of the polymer composition. The advantage of a higher content of light reflective material is a very low light transmission.

Preferably, the light reflective material is present in such an amount that the polymer composition, or the plastic component made thereof, has a light reflectance at a wavelength of 400 nm of at least 50%, more preferably at least 80%, and even more preferably at least 90%. For measuring the reflection rate, reflection spectra can be measured for example with a Minolta CM-2600D Spectrophotometer using so-called SpectraMagic software. For these measurements injection moulded plates of the materials described are used. The moulded plastic components produced have good mechanical strength, thermal resistance, dimensional stability, light reflectivity, and light shading properties.

Preferably, the polymer composition has a CIE Lab color index with an a-value of at most 1, a b-value of at most 2 and an L-value of at least 90. The products have a good whiteness after moulding, and low discoloration after heat treatment.

In another preferred embodiment the composition comprises a thermally conductive material (Compound D). The thermally conductive material may be an inorganic filler or inorganic reinforcing agent. Such materials include those having a thermal conductivity of at least about 5 W/mK.

The thermally conductive material preferably has a thermally conductivity of at least 10 W/mK, preferably at least 20 W/mK, more preferably at least 50 W/mK or even at least 100 W/mK. The thermally conductive material may be thermally conductive filler, such as aluminium oxide, aluminium nitride, boron nitride, boron carbide, calcium fluoride, and graphite, or a thermally conductive fibrous material, such as carbon fibres.

The thermally conductive material may be present in an amount varying over large range. Preferably, the thermally conductive material is present in an amount of 5-200 pbw, more preferably 10-150 pbw, or even 50-100 pbw, relative to 100 pbw of semi-aromatic polyamide X. When other components are present as well, the thermally conductive material (Compound D) is preferably present in an amount of 1.5-60 wt. %, more preferably 3-45 wt. %, or even 15-40 wt. %, relative to the total weight of the polymer composition. The advantage of a higher content of thermally conductive material is reflected in better heat sink properties and light sources producing more heat and resulting in higher temperatures, to which the plastic component is exposed, can be applied.

Preferably, the thermally conductive material is present in such an amount that the polymer composition, or the plastic component made thereof, has a thermal conductivity of at least 1 W/mk, more preferably at least 5 W/mk, and even more preferably at least 10 W/mk, or even at least 20 W/mk. The corresponding compositions offer superior properties in thermal mounting processes and enhanced thermal conductivity and heat dissipative properties, an effective combination for use of such materials in LED applications.

The thermal conductivity (A) can be determined by the procedure described by W. Nunes dos Santos, P. Mummery and A. Wallwork, Polymer Testing 14 (2005), 628-634. First the thermal diffusivity is determined according to ASTM E1461-01 with Netzsch LFA 447 laserflash equipment. Than the heat capacity (Cp) is determined using the same Netzsch LFA 447 laserflash equipment. From the thermal diffusivity (D), the density ($\rho$) and the heat capacity (Cp), the thermal conductivity ($\lambda$) can be calculated according to the formula: $\Lambda=D*\rho*Cp$.

The composition suitably comprises inorganic fillers and reinforcing agents (together indicated as Compound E), different from the light reflective materials (Compound C) and the thermally conductive materials (Compound D). The reinforcing agents may comprise different fibrous materials, including glass fibres, whiskers, wollastonite fibres, and carbon fibres, of which glass fibres are preferred in respect of attaining good mechanical properties and while retaining low electrical conductivity. Suitably, Compound E is present in an amount of 5-200 pbw, preferably 10-150 pbw, 50-100 pbw, relative to 100 pbw of semi-aromatic polyamide X. Relative to the total weight of the polymer composition, the Compound E may be present in an amount of 1.5-60 wt. %, preferably 3-45 wt. %, 15-30 wt. %.

The reinforcing agent has a strong increasing effect on the modulus of the composition above Tg, which increase is larger than in several other polyamides. This allows limitation of the amount of the reinforcing agent while still reaching very good mechanical properties. This is in particular advantageous when a high load of thermally conductive material and or light reflective material is required, while simultaneously retaining good flow properties. The overall effect is that the flow properties of these compositions are much better than corresponding compositions with similar mechanical properties based on for example polyamide 6T/66.

In view of the heat generated by the electric currents and light source the polymer composition may advantageously comprise one or more flame retardant materials (Compound F). The flame retardant system may comprise a halogenated flame retardant and/or a halogen free flame retardant, and next to the said flame retardant or combination thereof optionally also a flame retardant synergist.

These flame retardant materials may be added in appropriate amounts in addition to the other components to comply with regulatory flammability requirements for lighting systems. Suitably, the flame retardant system is present in a total amount of 1-40 wt. %, relative to the total weight of the composition. Preferably the flame retardant is present in an amount of 5-30 wt. %, more preferably 10-25 wt. %, and the synergist is preferably present in an amount of 0-15 wt. %, more preferably 1-10 wt. %, and still more preferably 5-10 wt. %, relative to the total weight of the composition.

The other polymer materials (Compound G) may comprise, for example, rubbers and thermoplastic polymers. Rubbers suitably include impact modifiers. The thermoplastic polymers may be other polyamides. Preferably, the polyamide is a semi-crystalline polyamide having a melting temperature which is lower than the melting temperature of high temperature semi-crystalline semi-aromatic polyamide. The other polymer is preferably present, if present at all, in an amount of less than 100 pbw, more preferably less than 50 pbw, still more preferably less than 20 pbw, relative to 100 pbw of the semi-aromatic polyamide. Also preferably, the other polymer materials are present in a total amount in the range of 0-25 wt. %, more preferably 1-20 wt. %, still more preferably 2-15 wt. %, and most preferably 5-10 wt. %, relative to the total weight of the composition. A lower amount of other polymers contributes to improved heat resistance and reduced outgassing upon long term exposure to elevated temperatures.

The polymer composition may advantageously comprise additives other than the components mentioned above (Compound H). These additives may be chosen from the auxiliary additives generally used in polymer compositions for moulding applications. These additives suitably include stabilizers, such as UV stabilizers, heat stabilizers and antioxidants, processing aids, such as flow promoting additives, lubricants and mould release agents, colorants, including pigments and dyes, plasticizers and impact modifiers.

These other additives, including the auxiliary additives, may be added in appropriate amounts in addition to the other components, as long as these additives do not deleteriously affect the performance characteristics of the polymer composition and the plastic component made thereof. These additives are typically used in small amounts and the appropriate amounts thereof can easily be determined by the person skilled in the art of making moulding compositions for lighting applications by routine experiments. The amount of the auxiliary additives may vary over a large range, but suitably is in the range of 0-12 wt. %, preferably 0.1-10 wt. %, more preferably 0.5-5 wt. %, relative to the total weight of the composition.

In a preferred embodiment, the plastic component is made of a polymer composition according to the invention, wherein the polymer composition consists of:
(I) 20-95 wt. % of semi-aromatic polyamide X and
(II) 0.6-60 wt. % of a light reflective material (Compound C) and/or a thermally conductive material (Compound D), and (III) 0.1-60 wt. % of a total amount of at least one of the following compounds other than (I) and (II): inorganic fillers and reinforcing agents (Compound E), flame retardant materials (Compound F), polymers (Compound G), and auxiliary additives (Compound H), or any combination thereof.

Herein the specific amounts of I, II and III must add up to 100 wt. %

The invention relates to a plastic component, or plastic part, for a lighting system comprising a polymer composition comprising a semi-aromatic polyamide X, as well as any preferred embodiment thereof, as mentioned above. Preferably, the plastic part is a light reflective plastic component and I or a thermally conductive plastic component.

The plastic component may be a plastic component that forms an integral part of a light source, a mounting substrate or other component affixed or secured to the light source or lighting armature, as well as a plastic component that forms an integral part of a lighting armature an integral part of a lighting armature. Examples of such components are LED components, such as a PLCC (Plastic lead chip carrier) LED reflector housing, also called reflector or reflector cup, and scramblers, primary or a secondary optic of a LED light source, a lamp base for example for an energy saving lamp, LED substrates and lamp mounting elements, reflector plates, in particular for backlight systems and UV ray production in backlight systems, reflectors of automotive lighting systems, heat sinks. A further advantage of the plastic component according to the invention, comprising the semi-aromatic polyamide X, next to the high blister and thermal resistance to short term high peak temperatures, is also the very good heat resistance and low outgassing upon long term exposure to elevated temperatures such as occur in automotive lighting systems, thus contributing to enhanced safety of such systems.

The invention also relates to a LED assembly. The LED assembly typically comprises different components, including (a) a die or a chip comprising a diode with an n-region and a p-region,
(b) one or two bond wires, or bonding wires, preferably consisting of gold,
(c) a lead system (or lead frame) consisting of two electrically conductive leads, the electrical leads being connected to either the n-region or the p-region of the diode, via the bonding wires, or alternatively one via a bonding wire and the other via a die attach layer
(d) a housing, also called reflector housing or reflector cup,
(e) a transparent encapsulation part, and optionally
(f) a lens and/or a
(g) heat sink.

The reflector cup can be made of a moulding composition, which moulding composition can be light-reflective itself, or the housing can be made reflective by metallizing the polymer surface. The transparent encapsulation part can for example be made of epoxy or silicon resin. The functions of the encapsulation part and the lens may be integrated. The function of the reflector cup and heat sink may be integrated as well. The die attach layer can also be a separate metal layer conducting heat to the heat sink and/or act as the electrical contact with the conductive lead frame.

In said LED assembly according to the invention, either the heat sink and/or the reflector cup are made of a polymer composition comprising semi-crystalline polyamide X.

The invention also relates to an assembling process for the production of a LED assembly comprising a chip or die, an electrically conductive lead system and a plastic component, wherein a chip bonding step is applied wherein the chip or die is mounted on the substrate bearing the electrically conductive lead frame and an electrically conductive contact between the chip, or die, and the electrically conductive lead frame is created. The chip bonding step in said process is a eutectic bonding step, wherein the bonding is accomplished with a layer of eutectic material. In the process according to the invention the substrate comprises a polymer composition comprising the semi-aromatic polyamide X, more particular the plastic component according to the invention, or any preferred embodiment thereof. Suitably, the substrate, or a part thereof, consists of the polymer composition comprising the semi-aromatic polyamide X. Suitably, in the eutectic bonding step a temperature profile with a peak temperature of at least 280° C., preferably in the range of 300-350° C., more preferably 315-330° C., is applied. In this process a contact layer, which constitutes the die attach layer, is formed consisting of an alloy of the solder composition and the metal, or metals, in the electrically conductive lead frame.

Eutectic bonding is herein understood to be a process to form a bond between two parts by using one part made of a first component, and the other part made of second component. When the parts are heated and brought into contact, diffusion occurs at the interface and alloys are formed. The eutectic composition alloy at the interface has a lower melting point than the materials at either side of it, and hence the melting is restricted to a thin layer, it is the melted eutectic material that forms the bond. Alternatively the materials at either side are the same and an alloy is used comprising a metal comprised by that same material. The advantage is that a low melting alloy can be used, and that upon heating and contact with the materials at either side migration occurs resulting in a bonding layer with a slight change in composition and having an increased melting temperature.

Preferably a gold-tin alloy is used, more preferably, the eutectic material is a eutectic Au (80%)/Sn (20%) alloy. The gold-tin alloy may be used to solder, nickel surfaces, but preferably it is used t alloy gold bearing surfaces, such as gold plating, sputtered gold films, or Au, Pt—Au and Pd—Au thick film metallization.

The invention also relates to a surface mounting process for the production of an electronic system comprising a chip or die package or LED assembly surface mounted on a substrate bearing a lead frame, the process comprising a reflow soldering step with a peak temperature of at least 250° C. In the reflow soldering process according to the invention, the chip/die package or LED assembly and/or the substrate comprises a plastic part having a polymer composition comprising the semi-aromatic polyamide X. More particularly, the polymer composition comprises further an inorganic material as according to the invention, or any preferred embodiment thereof.

Preferably, the process is a surface mounting process for the production of an electronic system comprising a chip/die assembly, comprising a plastic component according to the invention, and bearing an electrically conductive lead, mounted on a substrate bearing a lead frame, the process comprising a reflow soldering step for bonding the electrically conductive lead and the lead frame with a layer of soldering composition, wherein a peak temperature of at least 260° C., more preferably in the range of 260-290° C., and still more preferably in the range of 270-280° C. is applied.

Preferably, the electronic system is a lighting system, and also preferably, the chip is an LED chip.

In the eutectic bonding process and the reflow soldering process according to the invention, the plastic part is a plastic component according to the invention or a preferred embodiment thereof. The processes have the advantages described above, including the reduced blistering and better heat performance of the polymer composition.

The invention also relates to an electronic system obtainable by the eutectic bonding process or the solder reflow process according to the invention, or a combination thereof.

The invention also relates to a lighting system comprising a plastic component according to the invention. Preferably, the lighting system is an LED lighting device obtainable by one of the processes described here above, or a combination thereof.

The lighting system may also be a light source for a back light of a liquid crystal display screen for a cellular phone, PDAs, handheld devices, computer monitors, television, incar infotainment systems, GPS and the like, side indicators or headlight of an automobile and an instrument panel, lighting equipment, and the like.

The invention further relates to an electronic system comprising a component according to the invention and terminals of electrical leads wherein the terminals of the electrical leads are bonded by a layer of eutectic material to the chip/die.

In a particular embodiment the electronic system is an LED lighting device comprising a LED element (comprising a chip or die), a mounting substrate and a heat sink, the substrate comprising a metal lead frame at one side and/or a thermally conductive layer at the other side, the LED element comprising lead terminals and a reflector housing, the reflector being mounted to one side of the substrate and the heat sink being mounted to the other side of the mounting substrate, wherein either the metal lead frame and the lead terminals, and/or the thermally conductive layer and the heat sinks are bonded by a reflow soldering process or by eutectic bonding and at least one of the components of the mounting substrate, the reflective housing and the heat sink is made of a plastic composition according to the invention.

It is further noted that the light reflective and/or thermally conductive polymer composition according to the invention, comprising a light reflective material and/or a thermally conductive material, is also suitable for a making a moulded article for other electronic components comprising connectors, switches, relays, printed wiring boards, and, sliding components such as gears and cams, and automobile components such as air intake manifolds.

EXPERIMENTAL

The polyamide compositions used in the preparations of the lighting components were prepared by first preparing the polyamide polymer for Examples 1 to 5 (E-1 to E-5) and comparative examples (CE) A, B, C and F. Comparative examples D and E were commercial formulations.

Polymer Preparation

E-1 Polymer: PA-6T/4T/46 (Mole Ratio 67.5/21.3/11.2)

A mixture of 179.8 g tetramethylene diamine, 347.25 g hexamethylene diamine, 537 g water, 0.36 g sodium hypophosphite monohydrate, 72.36 g adipic acid and 653.38 g terephthalic acid was stirred in a 2.5 liter autoclave with heating and with the removal of water by distillation. It is noted that a slight excess of tetramethylene diamine of about 2-4 wt. % has been used, compared to the composition of the calculated polyamide composition, to compensate for the loss of tetramethylene diamine during the preparation of the polyamide. After about 27 minutes a 91 wt. % aqueous salt solution was obtained. In this process the temperature increased from 169° C. to 223° C. The polymerisation was effected at increasing temperatures of 210° C. to 226° C. for 21 minutes, during which the pressure rose to 1.3 MPa, after which the autoclave's contents were flashed and the solid product was cooled further under nitrogen. The prepolymer thus obtained was subsequently dried in a drying kiln for several hours heating at 125° C. under vacuum and a stream of nitrogen of 0.02 MPa. The dried prepolymer was post-condensed in the solid phase in a metal tube reactor (d=85 mm) for several hours heating at 200° C. under a stream of nitrogen (2400 g/h) and then under a stream of nitrogen/water vapour (3/1 weight ratio, 2400 g/h)) for 2 hours at 225° C. and 40 hours at 260° C. Then the polymer was cooled to room temperature.

E-2 Polymer: Preparation of PA-6T/4T/46 (mole ratio 74.5/10/15.5)

In the same way as for the E-1 Polymer a mixture of 127.09 g tetramethylene diamine, 350.05 g hexamethylene diamine, 487 g water, 0.66 g sodium hypophosphite monohydrate, 91.59 g adipic acid and 567.48 g terephthalic acid was stirred in a 2.5 liter autoclave with heating so-that an 91 wt. % aqueous salt solution was obtained after 22 minutes. In this process the temperature increased from 176° C. to 212° C. The polymerisation was effected at increasing temperatures of 220° C. to 226° C. for 22 minutes, during which the pressure rose to 1.4 MPa. The prepolymer thus obtained was subsequently dried in a drying kiln for several hours heating at 125° C. and 180° C. under vacuum and a stream of nitrogen of 0.02 Mpa. The prepolymer was post-condensed in the solid phase in a metal tube reactor (d=85 mm) for several hours heating at 190° C. and 230° C. under a stream of nitrogen (2400 g/h) and then under a stream of nitrogen/water vapour (3/1 weight ratio, 2400 g/h) for 96 hours at 251° C. Then the polymer was cooled to room temperature.

E-3 Polymer: Preparation of PA-6T/56 (Mole Ratio 85/15) Equivalent to PA-6T/5T/66 (Mole Ratio 70/15/15)

A mixture of 55.3 g of pentamethylene diamine (98 wt. %), 529.7 g aqueous hexamethylene diamine (59.6 wt. %), 360.4 g water, 0.5 g sodium hypophosphite monohydrate, 67.2 g adipic acid and 433.04 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 15 min, during which the pressure rose to 2.9 MPa, after which the autoclave's contents were flashed and the solid product was cooled further under nitrogen. The prepolymer was post-condensed in the solid phase in a metal tube reactor (d=85 mm) for several hours heating at 200° C. under a stream of nitrogen (2400 g/h) and then under a stream of nitrogen/water vapour (3/1 weight ratio, 2400 g/h)) for 2 hours at 230° C. and 24 hours at 260° C. Then the polymer was cooled to room temperature.

E-4 Polymer: Preparation of PA-6T/5T/56 (Mole Ratio 75.5/15/9.5)

A mixture of 78.4 g of pentamethylene diamine (98 wt. %), 473.3 g aqueous hexamethylene diamine (59.6 wt. %), 382.56 g water, 0.5 g sodium hypophosphite monohydrate, 42.6 g adipic acid and 461.5 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 15 min, during which the pressure rose to 2.8 MPa, after which the autoclave's contents were flashed and the solid product was cooled further under nitrogen. The prepolymer was subsequently dried and post-condensed in the solid phase in the same way as the E-1 polymer. Then the polymer was cooled to room temperature.

E-5 Polymer: Preparation of PA-6T/66/56 (Mole Ratio 76.5/12/11.5)

A mixture of 36.9 g of pentamethylene diamine (98 wt. %), 553.0 g aqueous hexamethylene diamine (59.6 wt. %), 351.2 g water, 0.5 g sodium hypophosphite monohydrate, 105.8 g adipic acid and 391.4 g terephthalic acid was stirred in a 2.5 liter autoclave with heating and with distillative removal of water. After 35 minutes a 90 wt. % aqueous salt solution was obtained, while the temperature rose from 170° C. to 212° C. Then the autoclave was closed. The polymerisation was effected at increasing temperatures of 212° C. to 250° C. for 25 minutes. The mixture was stirred at 250° C. for 20 min, during which the pressure rose to 2.8 MPa, after which the autoclave's contents were flashed and the solid product was cooled further under nitrogen. The prepolymer was subsequently dried and post-condensed in the solid phase in the same way as the E-1 polymer. Then the polymer was cooled to room temperature.

CE-A Polymer: PA6T/66 (Molar Ratio 60/40)

In the same way as for Polymer I a mixture of 520 g hexamethylene diamine, 537 g water, 0.36 g sodium hypophosphite monohydrate, 330 g adipic acid and 420 g terephthalic acid was stirred in a 2.5 liter autoclave with heating so-that an 91 wt. % aqueous salt solution was obtained after 27 minutes. In this process the temperature increased from 169° C. to 223° C. The polymerisation was effected at increasing temperatures of 210° C. to 226° C. for 21 minutes, during which the pressure rose to 1.3 MPa. The prepolymer was subsequently dried and post-condensed in the solid phase in the same way as the E-1 Polymer. Then the polymer was cooled to room temperature.

CE-B,C Polymer: PA 46

In the same way as for Polymer I a mixture of 430.4 g tetramethylene diamine, 500 g water, 0.33 g sodium hypophosphite monohydrate and 686.8 g adipic acid was stirred in a 2.5 liter autoclave with heating so-that a 90 wt. % aqueous salt solution was obtained after 25 minutes. In this process the temperature increased from 110° C. to 162° C. The polymerisation was effected at increasing temperatures of 162° C. to 204° C. in during which the pressure rose to 1.3 MPa. The prepolymer was subsequently dried and post-condensed in the solid phase in the same way as for the E-1 polymer. Then the polymer was cooled to room temperature.

Comparative Example CE-F

Preparation of PA-6T/5T (Mole Ratio 56/44)

A mixture of 201.4 g of pentamethylene diamine, 300.8 g hexamethylene diamine, 521.1 g water, 0.65 g sodium hypophosphite monohydrate and 722.18 g terephthalic acid was stirred in a 2.5 liter autoclave with heating and with distillative removal of water. After 27 minutes a 90 wt. % aqueous salt solution was obtained, while the temperature rose from 170° C. to 211° C. Then the autoclave was closed. The polymerisation was effected at increasing temperatures of 211° C. to 250° C. in 15 minutes. The mixture was stirred at 250° C. for 29 min, during which the pressure rose to 2.9 MPa, after which the autoclave's contents were flashed and the solid product was cooled further under nitrogen. The prepolymer was subsequently dried and post-condensed in the solid phase in the same way as for the E-3 polymer. Then the polymer was cooled to room temperature.

Compound Preparation

E-1 to E-5, CE-A to C and CE-F also included the following components:

Standard glass fibre grades for polyamides;
    Flame retardant: brominated polystyrene (Saytex® HP3010 available from Albermarle);
    Flame retardant synergist: zinc borate (Firebrake® 500 available from Luzenac); and
    Auxiliary additives comprising a release agent and a stabilizing package, Comparative Experiments D and E were based on commercial products: CE-D being Zytel HTNFR52G30BL, a PA6T/66 product from DuPont, and CE-E being Genestar GN2332 BK, a PA9T product from Kururay. Conventional analytical techniques were used to estimate the proportions of brominated polystyrene, sygnergists and auxiliary additives used in these commercial products. Analysis of the PA9T product from Genestar revealed that the polyamide component consisted of PA8T and PA9T in a molar ratio of approximately 20:80.

The compounds of E-1 to E-5, CE-A to C and CE-F were prepared on a Werner & Pfleiderer KSK 4042D extruder set on a 325° C. flat temperature. All components were dosed into the feed port of the extruder, except for the glass fibers that were dosed separately into the melt via a side feed port. The polymer melt was degassed into strands at the end of the extruder, cooled and chopped into granules.

Injection Moulding:

The materials described above were pre-dried prior to use in injection moulding, by applying the following conditions: the copolyamides were heated under vacuum of 0.02 Mpa to 80° C. and kept at that temperature and pressure for 24 hrs while a stream of nitrogen was passed. The pre-dried materials were injection moulded on an Arburg 5 injection moulding machine with a 22 mm screw diameter and a Campus UL 0.8 mm 2 body injection mould. The temperature of the cylinder wall was set at 345° C., and the temperature of the mould was set at 140° C. The Campus UL bars thus obtained were used for further tests.

TABLE I

| Compound compositions | | | | | | | | | | | |
|---|---|---|---|---|---|---|---|---|---|---|---|
| | E-1 | E-2 | E-3 | E-4 | E-5 | CE-A | CE-B | CE-C | CE-D | CE-E | CE-F |
| Polymer % | 42 | 37 | 42 | 42 | 42 | 42 | 37 | 42 | 41 | 41 | 42 |
| Glass fibers | 30 | 40 | 30 | 30 | 30 | 30 | 40 | 30 | 30 | 33 | 30 |
| Brominated polystyrene | 20 | 16 | 20 | 20 | 20 | 20 | 16 | 20 | 24 | 20 | 20 |
| Synergist | 7 | 6 | 7 | 7 | 7 | 7 | 6 | 7 | 4 | 5 | 7 |
| Aux. additives | 1 | 1 | 1 | 1 | 1 | 1 | 1 | 1 | 1 | 1 | 1 |

Test Methods
Relative viscosity (RV) was determined in 1 mass % formic acid solution.
Spiral flow was determined on spiral cavity with dimensions 280×15×1 mm at a temperature 10° C. above the melt temperature of semi-aromatic polyamide X at 80 MPa effective injection pressure.
Thermal Characterization by DSC:
Melting point ($T_m$) and glass transition temperature ($T_g$) were determined with the aid of differential scanning calorimetry (DSC) (2nd run, 10° C./min.) according to ASTM D3417-97 E793-85/794-85.
E-modulus was determined in a tensile test at 23° C. and 5 mm/min, according to ISO 527.
Impact test (notched-Charpy) was determined at 23° C. according to ISO 179/1A.
Water/Humidity Absorption Tests:
Pre-dried samples (0.8 mm UL bars) were conditioned in a humidifying cabinet or a container of distilled water at a preset temperature and humidity level, the weight increase was monitored over time until the saturation level was reached. The weight increase at saturation level was calculated as a percentage of the starting weight of the pre-dried sample.
Blistering Performance Under Reflow Soldering Conditions.
For the blistering performance under reflow soldering conditions a large number of pre-dried samples were conditioned in a humidifying cabinet at a preset temperature and humidity level in the same way as for water absorption test described above. At different time intervals individual samples (in lots of 10) were taken from the cabinet, shortly cooled at ambient conditions to room temperature, put in a reflow oven and subjected to temperature conditions as applied in reflow soldering processes. The temperature profile applied was the following. First the samples were preheated with a heating ramp of average 1.5° C./sec to reach a temperature of 140° C. after 80 seconds, after which the sample was heated more gradually to reach a temperature of 160° C. after 210 sec from the start. Then, the sample was heated to 260° C. with a initial heating ramp of about 6° C./sec to reach a temperature of 220° C. after 220 sec and a more gradual heating rate of 2° C./sec to reach a temperature of 260° C. after 290 sec from the start. After that, the sample was cooled down to 140° C. in 20 sec. Then the 10 samples were taken from the oven, let cool to room temperature and inspected for the presence of blisters. For each condition period in the humidifying cabinet the percentage of samples that showed occurrence of blistering was rated. The percentage of samples with blisters was recorded.
Coefficient of linear thermal expansion was determined in accordance with ISO 11359-1/-2.
Dielectric constant of the sample (DAM) was determined in accordance with IEC 60250 at a frequency of 3 Ghz at 23° C.
Dielectric strength of the sample (DAM) was determined in accordance with IEC 60243-1.
Comparative Tracking Index was determined in accordance with IEC 60112.
Heat Deflection Temperature was determined in accordance with ISO 75-1/-2 with a load of 1.8 MPa applied.
All compounds complied with UL-94-V0 for 0.8 mm test bars.
Results
The results of the experimentation are presented in Table 2.
As illustrated in Table 2, the compositions of the present invention overcome the problems associated with soldering lighting components with conventional polyamide compositions by providing a polyamide composition with improved blistering resistance, dimensional stability and mechanical properties at high temperatures, while at least retaining the required processing, electrical and flame retardant properties of conventional compositions.

The compositions of the present invention have been found to provide improved blister performance against polyamide compositions suitable for lighting component applications. Compositions under the scope of the present invention were found to comply with the requirements of the JEDEC 2/2a blister test (IPC/JEDEC J-STD-020C July 2004). In contrast, none of the comparative examples were able to comply with this industry standard.

JEDEC level 2 is achieved if no blistering is observed after reflow soldering conditions after conditioning the samples for 168 hrs at 85° C. and 85% relative humidity.

JEDEC level 2a is achieved if no blistering is observed after reflow soldering conditions after conditioning the samples for 696 hrs at 30° C. and 60% relative humidity.

Of the comparative examples, CE-E which included a polyamide 9T based composition recorded the best blister performance, although still considerably lower than the compositions within the scope of the present invention. This finding is to be expected, based upon the lower moisture absorption of the CE-E. Indeed, the blister results within the comparative examples reveal a correlation between blister performance and moisture uptake levels.

The teaching that improved blistering performance is to be achieved through producing a more hydrophobic polyamide which absorbs less moisture is also present in previously mentioned U.S. Pat. No. 6,140,459 and WO2006/135841 which discloses improved blister performance in a polyamide composition comprising repeating units derived from dicarboxylic acid monomers comprising terephthalic acid and aliphatic diamines having 10 to 20 carbon atoms (eg. PA10T). Thus, it is surprising that the examples under the scope of the present invention have superior blister performance, compared to conventional polyamides, despite their relatively high water uptake.

For comparison purposes it is noted that in the cited art U.S. Pat. No. 6,140,459 the blistering was tested after 96 hrs conditioning at 40° C., 95% RH, and applying peak temperatures up to 250° C. In those tests PA 6T/66 already failed at 240° C. and PA 6T/D6 did not even pass 210° C.

In contrast to comparative examples, the compositions of the present invention exhibit isotropic behaviour, as illustrated by the lower variation in the coefficient of linear thermal expansion (CLTE) between normal and parallel directions of the polymer flow. This low variance results in components which are less prone to warp. This property is becoming increasingly important due to the trend towards a reduction in component wall thicknesses. Similar improvements were also observed in respect to mold shrinkage performance.

Likewise stiffness at high temperature, as measured by the temperature of deflection under load ($T_{def}$), is an increasing important parameter to enable thin wall components to mechanically withstand the high temperature environment encountered during the soldering process. The compositions of the present invention exhibit improved stiffness at high temperature, with component parts able to withstand loads to within 11° C. of their melting point compared to about a 20° C. difference between $T_m$ and $T_{def}$ of the PA 66/6T and PA 9T based compositions.

TABLE 2

Performance characteristics of lighting component polyamide compositions

| | E-1 | E-2 | E-3 | E-4 | E-5 | CE-A | CE-B | CE-C | CE-D | CE-E | CE-F |
|---|---|---|---|---|---|---|---|---|---|---|---|
| CLTE Parallel/Normal (×10$^{-5}$ K$^{-1}$) | 3.0/3.7 | 3.0/3.1 | | | | 2.2/5.8 | 2.5/5.0 | 2.5/5.4 | 2.1/6.0 | 3.0/4.0 | |
| CLTE Normal-Parallel (×10$^{-5}$ K$^{-1}$) | 0.7 | 0.1 | | | | 3.6 | 2.5 | 2.9 | 3.9 | 1.0 | |
| % Blister @ 12 hr 85° C./85% | 0 | 0 | | | | | | | 100 | 100 | |
| % Blister @ 48 hr 50° C./95% | 0 | 0 | | | | 100 | | | 100 | 20 | |
| % Blister @ 96 hr 85° C./60% | 0 | 0 | 0 | 20 | 30 | | 100 | 100 | 80 | 40 | 100 |
| % Blister @ 168 hr 85° C./60% | 0 | 20 | | | | | 100 | 100 | 100 | 100 | |
| % Blister @ 696 hr 30° C./60% | 0 | 0 | | | | | 100 | 100 | 80 | 80 | |
| H$_2$O uptake 50° C. 95% (% wt.) | 2.9 | 2.5 | | | | 2.3 | 3.6 | 4.8 | 2.8 | 1.1 | |
| H$_2$O uptake (in H$_2$O) 23° C. (% wt.) | 3.8 | 3.3 | 4.0 | 4.8 | 5.3 | 3.2 | 4.5 | 5.5 | 3.3 | 1.0 | 5.5 |
| Melting temperature T$_m$ (° C.) | 318 | 320 | 320 | 311 | 313 | 313 | 295 | 295 | 305 | 305 | 312 |
| Glass transition temp. T$_g$ (° C.) | 134 | 135 | 126 | 120 | 110 | 100 | 75 | 75 | 90 | 125 | 142 |
| Temp. of deformation T$_{def}$ (° C.) | 307 | 309 | 307 | 295 | 297 | 291 | 290 | 290 | 285 | 285 | 282 |
| T$_m$ − T$_{def}$ (° C.) | 11 | 11 | 13 | 16 | 16 | 22 | 5 | 5 | 20 | 20 | 30 |
| Dielectric strength-DAM (kV/mm) | 33 | 33 | | | | 36 | 30 | 30 | 37 | 30 | |
| −70° C./62% RH (kV/mm) | 33 | 33 | | | | | 20 | 20 | | | |
| −23° C./100% RH (kV/mm) | 25 | 24 | | | | | 4 | 4 | | | |
| Dielectric constant 23° C. (3 GHz) | 3.4 | | | | | 3.7 | | 4.2 | 3.8 | 3.3 | |
| CTI (V) | 520 | 480 | | | | 520 | 320 | 220 | 520 | 400 | |
| RV pellets/UL bars | 1.95/1.87 | 1.95/1.91 | 2.0/— | | | 2.33/2.41 | | | 1.97/1.95 | | 3.2/— |
| E-mod (GPa) | 13.5 | 16.5 | | | | 13.0 | 12 | 15 | 12 | 13 | |
| Charpy Notched (KJ/m$^2$) | 14 | 17 | | | | 13 | 12 | 11 | 10 | 14 | |
| Spiral flow: 80 MPa (mm) | 153 | 135 | | | | 127 | 110 | 130 | 153 | 177 | |

The invention claimed is:

1. A polymer composition comprising 100 pbw of a semi-aromatic polyamide (X) and 1-250 pbw of an inorganic material, the semi-aromatic polyamide X comprising repeat units derived from (A) dicarboxylic acids and (B) aliphatic diamines, wherein:
   (a) the dicarboxylic acids (A) consist of (A1) a mixture of 5-65 mole % aliphatic dicarboxylic acid and optionally aromatic dicarboxylic acid other than terephthalic acid, and (A2) 35-95 mole % terephthalic acid;
   (b) the aliphatic diamines (B) consist a mixture of (B1) 10-70 mole % of a short chain aliphatic diamine with 2-5 C atoms and (B2) 30-90 mole % of a long chain aliphatic diamine with at least 6 C atoms, wherein 50-100 mole % of the long chain diamine (B2) consists of a diamine having 6 to 9 carbon atoms; and
   (c) the combined molar amount of the terephthalic acid (A2) and the long chain aliphatic diamine (B2) is at least 60 mole %, relative to the total molar amount of the dicarboxylic acids and diamines.

2. The polymer composition according to claim 1, wherein the inorganic material comprises (a) a light reflective material (Compound C) and/or (b) a thermally conductive material (Compound D).

3. The polymer composition according to claim 1, wherein the inorganic material comprises a Compound C selected from the group consisting of titanium oxide (TiO2), calcium carbonate, barium sulphate, wollastonite, potassium titanate, mineral clays, and/or a Compound D selected from the group consisting of aluminium oxide, aluminium nitride, boron nitride, boron carbide, calcium fluoride, and graphite.

4. The polymer composition according to claim 2, wherein the polyamide composition has a light reflectivity of at least 50%, and/or a thermal conductivity of at least 1 W/mK.

5. The polymer composition according to claim 1, wherein the polymer composition comprises:
   (I) 20-95 wt. % of semi-aromatic polyamide X, and
   (II) 0.6-60 wt. % of a light reflective material (Compound C) and/or a thermally conductive material (Compound D), and optionally
   (III) a fibrous reinforcing agent and/or inorganic filler (Compound E), a flame retardant (Compound F), a polymer other than the other compounds (Compound G), or one or more other additives (Compound H), or any combination thereof, wherein
   the wt. % are relative to the total weight of the composition.

6. A component for a lighting system comprising a semi-aromatic polyamide (X) comprising repeat units derived from (A) dicarboxylic acids and (B) aliphatic diamines, wherein:
   (a) the dicarboxylic acids (A) consist of (A1) a mixture of 5-65 mole % aliphatic dicarboxylic acid and optionally aromatic dicarboxylic acid other than terephthalic acid, and (A2) 35-95 mole % terephthalic acid;
   (b) the aliphatic diamines (B) consist of (B1) a mixture of 10-70 mole % of a short chain aliphatic diamine with 2-5 C atoms and (B2) 30-90 mole % of a long chain aliphatic diamine with at least 6 C atoms, wherein 50-100 mole % of the long chain diamine (B2) consists of a diamine having 6 to 9 carbon atoms; and
   (c) the combined molar amount of the terephthalic acid (A2) and the long chain aliphatic diamine (B2) is at least 60 mole %, relative to the total molar amount of the dicarboxylic acids and diamines.

7. The component according to claim 6, wherein the semi-aromatic polyamide (X) is present in a polymer composition comprising 100 pbw of the semi-aromatic polyamide (X) and 1-250 pbw of an inorganic material.

8. The component according to claim 6, wherein the component is selected from the group consisting of PLCC LED reflector housings, scramblers, primary or a secondary optics of a LED light source, lamp bases, LED substrates, lamp mounting elements, reflector plates, reflectors of automotive lighting systems, and heat sinks.

9. A lighting system comprising a component according to claim 6.

10. The lighting system according to claim 9, wherein the lighting system is an LED lighting device.

11. A moulded article comprising the polymer composition according to claim 1, wherein the moulded article is selected from the group consisting of connectors, switches, relays, printed wiring boards, heat sinks, sliding components, gears, cams, and automotive components.

12. The moulded article according to claim 11, wherein the molded article is an air intake manifold.

* * * * *